United States Patent [19]
Van Becelaere

[11] 3,841,394
[45] Oct. 15, 1974

[54] MINIMUM AIR VOLUME CONTROL DEVICE

[75] Inventor: Robert M. Van Becelaere, Shawnee Mission, Kans.

[73] Assignee: Tempmaster Corporation, Kansas City, Mo.

[22] Filed: Aug. 2, 1973

[21] Appl. No.: 385,187

[52] U.S. Cl............... 165/30, 137/625.28, 236/49, 236/78
[51] Int. Cl. .................... F24f 11/04, G05d 23/275
[58] Field of Search................... 236/49, 1 C, 78 C; 137/625.28; 318/467 X; 165/30

[56] References Cited
UNITED STATES PATENTS
965,322    7/1910    Peterson ..................... 137/625.28
3,687,364  8/1972    McNabney .......................... 236/49

Primary Examiner—William E. Wayner
Attorney, Agent, or Firm—Lowe, Kokjer, Kircher, Wharton & Bowman

[57] ABSTRACT

Apparatus and method for varying airflow in a variable air volume distribution system. A thermostat control normally acts to vary airflow to maintain constant temperature. In order to establish a minimum volume of airflow, a pressure differential member senses airflow volume and actuates an override switch to stop further decrease in or to increase the airflow when it drops to a predetermined minimum level.

4 Claims, 6 Drawing Figures

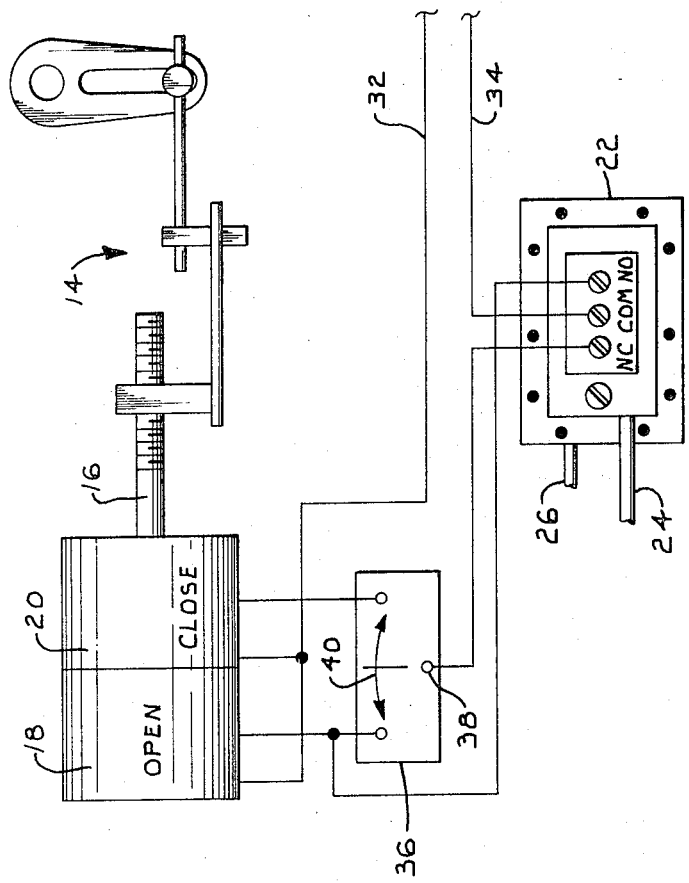
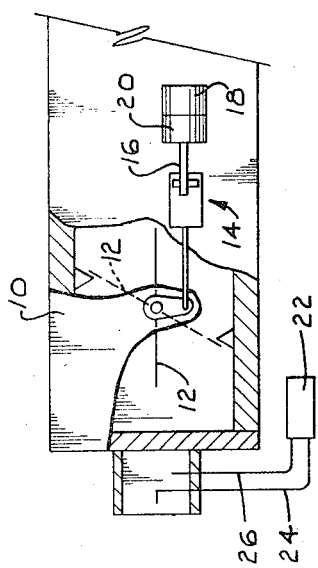
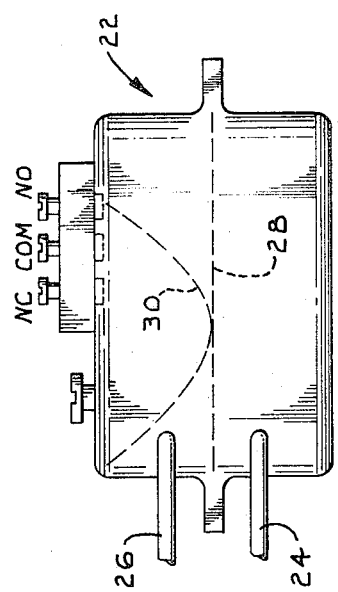

MINIMUM AIR VOLUME CONTROL DEVICE

BACKGROUND OF THE INVENTION

This invention relates to conditioned air distribution systems of the type wherein air which has been conditioned at a central source is distributed to a plurality of zones. One type of such system provides air at constant temperature, and the volume of air delivered to a zone is varied in accordance with zone demands.

This system, which may be termed a variable air volume system, offers many advantages which flow from requiring only one source of conditioned air at constant temperature. Ductwork can be kept relatively simple, and control valves generally do not have to be duplicated as may be the case in a dual-duct, dual-air source system. The variable air volume system lends itself particularly well to a structure with a more or less consistent seasonal requirement for either heating or cooling, for example, the interior portions of an office building wherein the heat provided by lighting and occupants is sufficient to meet or exceed heating requirements, and a consistent requirement for cooling exists.

For proper efficiency and for ventilation purposes, it has been found desirable to maintain a minimum volume of airflow to the zone at all times even though the zone may be out of the desired temperature range.

Accordingly, a broad object of the invention is to provide electrical controls for such a system which are responsive both to temperature in the zone as well as the volume of airflow delivered thereto, and normally operating to vary airflow to maintain constant temperature, but yet capable of overriding the temperature control to assure that airflow does not drop below a predetermined level. It is a feature of the invention to provide an override control switch which is sensitive to and actuated by the volume of airflow delivered.

Another object is to provide a thermostatically operated electrical switch for normal air volume control in maintaining constant temperature, and an electrical override switch that acts to increase airflow whenever it drops to the predetermined level.

Yet another object is to provide an override switch arranged to interrupt and stop further decrease in airflow volume when the predetermined minimum level is reached.

A further object is to arrange the override switch to also actuate and turn on an auxiliary heat source upon overriding the temperature control to thereby prevent excessive cooling of the zone.

Another broad object of the invention is to provide a method for controlling such a variable air volume distribution system that varies air volume normally to maintain constant temperature, but which is effective to maintain a minimum airflow volume to the zone at all times.

Other and further objects of the invention, together with the features of novelty appurtenant thereto, will appear in the course of the following description.

FIG. 1 is a schematic view of the terminal end of a duct delivering conditioned air to a zone;

FIG. 2 is a combined circuit diagram and schematic view of the electrical control circuitry and motor operator of one form of the invention;

FIG. 3 is an elevational view of the pressure differential sensor and override switch;

Figure 4:
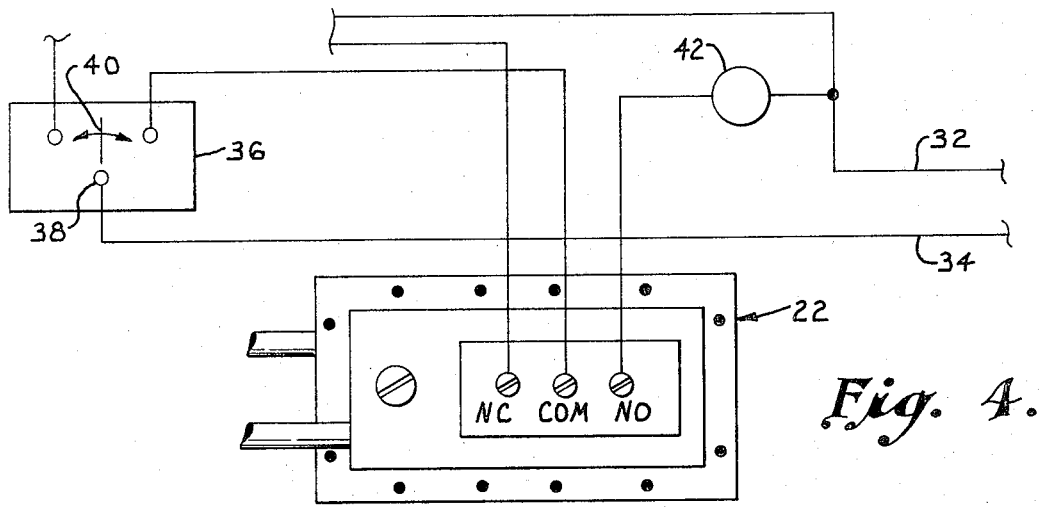
FIG. 4 is a schematic and circuit diagram similar to FIG. 2, but showing another form of the invention.

Referring more particularly to FIGS. 1–3, there is illustrated an air terminal or outlet unit 10 connected to a central source (not shown) of conditioned air and having an outlet, not shown, for delivering conditioned air to the surrounding zone. Within unit 10 is a centrally pivotal, air throttling means in the form of a damper blade 12 shiftable from its horizontal maximum airflow volume position shown, toward a fully closed position shown in broken lines wherein airflow to the zone is substantially blocked. Variable positioning of blade 12 alters the airflow volume delivered.

Appropriate linkage 14, including a rotary shaft 16, couples blade 12 to an electric motor operator which includes reversely operating electric motor windings 18 and 20. The windings 18 and 20 coaxially mount on shaft 16 to drive damper blade 12 in opposite directions respectively to open and close the blade and thereby increase, decrease airflow volume. For an example of the operation of the motor see the Frank J. Dean, Jr. U.S. Pat. No. 3,363,536.

A pressure differential sensitive switch generally denoted by the numeral 22 is located adjacent unit 10 and includes a pair of pressure sensing conduits 24, 26 that respectively transmit airflow pressure and static pressure to opposite sides of a shiftable member 28 (See FIG. 3). Switch 22 is of the snap action type having a conductor 30 normally making connection between the poles denoted "NC" and "COM." Upon a drop in the magnitude of the pressure differential — indicative of a drop in airflow volume below a predetermined level — member 28 causes conductor 30 to break its normal connection and connect pole "NO" with "COM." The structure and operation of such a pressure differential operated switch are well known within the art and more detailed description will not be included herein.

The electrical controls for motor windings 18 and 20 are schematically shown in FIG. 3 and include control voltage wires 32 and 34 that connect with an electrical power source not shown. (Alternatively, electronic units incorporating thermometers, and the like, for sensing air velocity may be used instead of the schematically indicated device.) Wire 32 is connected directly in parallel with the two windings (18 and 20) while a thermostat switch 36 and the pressure differential operated override switch 22 are connected with wire 34. The normal connection of override switch 22 connects wire 34 with center pole 38 of the thermostat which includes a bimetallic element 40 capable of responding to the temperature in the zone thereby effecting a close circuit condition to either winding 18 or 20. Such a condition then operates to either increase or decrease airflow volume.

In an air cooling system, for instance, the thermostat switch actuates motor winding 18 to increase airflow when temperature is too high, and actuates motor winding 20 to decrease airflow when the temperature is too low. Accordingly, airflow is varied to maintain constant temperature in the zone.

Pole "NO" (normally open) of override switch 22 is connected in parallel with the damper-opening motor winding 18 thereby bypassing the thermostat switch. In operation, whenever sufficient airflow is passing into the zone, switch 22 connects "NC" with "COM" to allow normal control by thermostat switch 36 to maintain constant temperature control. Once airflow drops below a predetermined minimum level, switch 22 is actuated to connect the "COM" pole terminal with the "NO" pole, bypassing switch 36 and directly activating motor winding 18 to stop further decrease and increase airflow regardless of temperature conditions. This establishes, at all times, a minimum volume of conditioned airflow to the zone. Switch 22 also assures that damper 12 will be in its wide open position offering minimal resistance to airflow during start-up of the system. Once airflow volume increases above the low limit level, switch 22 snaps back to its normal position allowing the thermostat switch 36 again to control airflow volume to maintain constant temperatures.

In the control circuitry of FIG. 4, override switch 22 is connected in series arrangement with thermostat switch 36 between the latter and the damper-closing motor winding 20. The normal connection ("NC" pole with the "COM") of switch 22 again allows complete control of the motor windings by thermostat switch 36 in the manner above described to maintain substantially constant temperatures.

Also included in the circuitry is a supplementary heat source (schematically illustrated and denoted by numeral 42) that is electrically connected with control voltage wire 32 and the "NO" pole of the override switch 22. In operation of this embodiment, thermostat switch 36 is effective at all times to actuate motor winding 18 and increase airflow when temperature conditions so dictate. When the thermostat switch is in position to actuate motor winding 20 to reduce airflow, it is subject to the position of override switch 22. As long as airflow volume is sufficient and switch 22 is in its normal position, the thermostat switch can cause a decrease in airflow volume by actuating motor 20.

When airflow drops below the desired low limit, however, switch 22 is actuated to connect the "COM" pole with the "NO" pole. Motor winding 20 cannot now be actuated and further decrease in airflow volume is thereby stopped or prevented. If thermostat switch 36 is in its rightward position attempting to decrease airflow (indicative of an excessively cool zone) the supplementary heating source 42 is thereupon activated to produce an inflow of heat to the zone. If thermostat switch 36 is in its leftward position, motor winding 18 is actuated to increase airflow and the heating source is not activated. Accordingly, a predetermined minimum flow volume is established as in the FIG. 3 arrangement, and additionally a supplementary heat source can simultaneously be activated to prevent excessive cooling. Once airflow increases to a level returning the override switch 22 to its normal position, complete control of airflow volume by the thermostat switch resumes.

Figure 5:
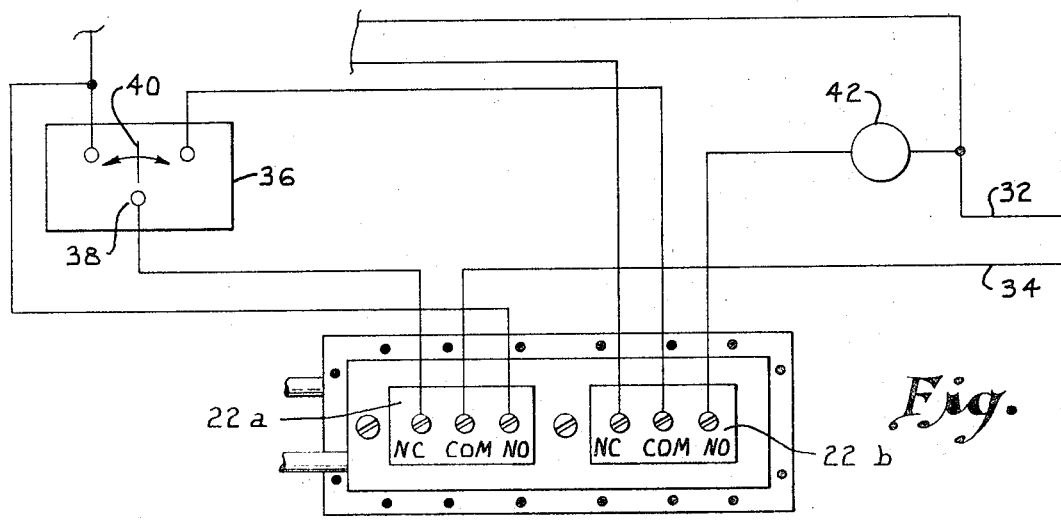
FIG. 5 is a view similar to FIG. 2, and showing yet another form of the invention.

The arrangement in FIG. 5 combines the attributes and structure of both FIGS. 3 and 4 by including a first switch 22a connected and operative similar to switch 22 of FIG. 3, and a second switch 22b connected and operative similar to switch 22 in FIG. 4. Switch 22b is actuated when airflow drops below a preselected level which is slightly greater than the predetermined minimum level at which switch 22a is actuated.

Accordingly, whenever airflow volume is above the preselected level the thermostat switch 36 alone controls motor windings 18 and 20. When airflow volume drops below the preselected level, switch 22b is actuated to connect the thermostat with the supplementary heat source 42 instead of motor winding 20. Further damper closing is thereby stopped and the heat source 42 is activated. If airflow volume drops further to the predetermined minimum level, switch 22a is actuated to immediately cause increase in airflow volume by direct actuation of motor winding 18, and at the same time to afford protection to heat source 42 by turning it off due to the series arrangement of switches 22a and 22b.

This construction thereby includes the temperature stabilizing advantage afforded by the supplementary heat source, while retaining the capability of causing immediate increase in airflow volume to maintain ventilation and protects the heating source from operation during periods when there is insufficient airflow past the electrical heat source.

Figure 6:
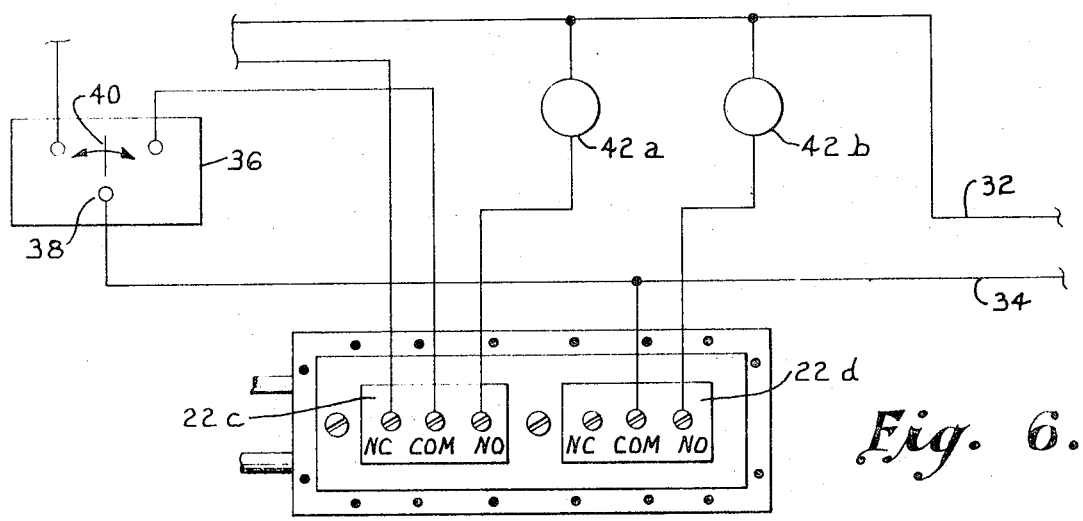
FIG. 6 is a view similar to FIG. 2 showing a further embodiment of the invention.

The arrangement shown in FIG. 6 includes the entire circuitry of the FIG. 4 arrangement, with switch 22c operating in a similar manner to that shown in FIG. 4 to interrupt the actuation of motor winding 20 and to activate a heat source 42a when airflow volume drops to the predetermined minimum level. A second differential pressure operated switch 22d, similar to the previous switches except that its pole "NC" position is inoperative, has its normally open pole ("NO") connected to a second supplementary heat source 42b. Switch 22d is actuated by a preselected airflow volume slightly greater than that which operates switch 22c. Thus, as airflow volume falls and the thermostat switch 36 is in its right-hand position, switch 22d will first be actuated to activate heat source 42b, and further drop in airflow volume will actuate switch 22c to render motor 20 inoperative and activate heat source 42a. It will be apparent that a cascade of heat source can be included simply by providing a corresponding control switch 22d for each heat source. Further, it will be apparent that such a cascade could also be included in the prior described arrangements of FIGS. 3, 4 or 5.

From the above, it can be seen that a method of controlling a variable air volume distribution system is provided in each of the FIGS. 3, 4, 5 and 6 arrangements which include the steps of sensing both the temperature of the zone and the volume of airflow being delivered to the zone; normally varying airflow volume in response to temperature by action of thermostat switch 36; and establishing a minimum airflow volume to the zone by overriding the temperature control and controlling airflow volume by the override switch in relation to the airflow volume whenever it drops below the predetermined level. In FIG. 3 the minimum airflow is established by causing an immediate increase in airflow volume when the minimum level is reached, while in the FIG. 4 arrangement further decrease in airflow volume is prohibited by switch 22 when the minimum level is reached.

The arrangements discussed above provide control circuitry which, unlike mechanical arrangements for providing low limit on airflow volume, does not require field adjustment. Because switch 22 is operated by differential pressure, the operation is independent of variations in air pressure in the system and is responsive only to variations in air flow volume due to the pilot arrangements of conduits 24 and 26. At the same time, the controls allow the thermostat to cycle the unit and activate it whenever the zone temperature becomes excessive.

From the foregoing, it will be seen that this invention is one well adapted to attain all of the ends and objects hereinabove set forth, together with other advantages which are obvious and which are inherent to the structure.

It will be understood that certain features and subcombinations are of utility and may be employed without reference to other features and subcombinations.

As many possible embodiments may be made of the invention without departing from the scope thereof, it is to be understood that all matter herein set forth or shown in the accompanying drawings is to be interpreted as illustrative and not in a limiting sense.

Having thus described my invention, I claim:

1. In an air distribution system for delivering conditioned airflow at a preselected substantially constant temperature to a plurality of zones wherein the temperature at each of said zones is controlled by varying the volume of airflow to said zone;
    an air throttling means for varying the volume of conditioned air delivered to said zone;
    an electric motor operator coupled to said air throttling means to drive the latter in opposite directions to increase and decrease the volume of airflow;
    a thermally responsive thermostat control switch disposed to sense temperature in said zone and connected with said motor operator for actuating the latter to vary airflow to maintain substantially constant temperature in said zone;
    a first override control switch connected to said motor operator, said first override control switch effective when actuated to override said thermostat control switch and actuate said motor operator to stop further decrease in the volume of airflow to thereby establish a minimum volume of conditioned airflow delivered to said zone, said first override switch including means for sensing the volume of airflow to said zone and for actuating said first override switch whenever said volume of airflow drops to a predetermined minimum level;
    an electrically controlled heat source in said zone; and
    a second override control switch connected with said heat source and operable to activate said heat source upon being actuated by said airflow sensing means whenever said volume of airflow drops to a preselected level, said preselected level of airflow being greater than said predetermined minimum level.

2. An air distribution system as set forth in claim 1, wherein said second override control switch is connected with said motor operator and is effective when actuated to interrupt operation of said motor operator to prevent further decrease in volume of airflow delivered to said zone and to turn off said electrical heat source when said air flow drops to a preselected level.

3. In an air distribution system for delivering conditioned airflow at a preselected substantially constant temperature to a plurality of zones wherein the temperature at each of said zones is controlled by varying the volume of airflow to said zone;
    an air throttling means for varying the volume of conditioned air delivered to said zone;
    an electric motor operator coupled to said air throttling means to drive the latter in opposite directions to increase and decrease the volume of airflow;
    a thermally responsive thermostat control switch disposed to sense temperature in said zone and connected with said motor operator for actuating the latter to vary airflow to maintain substantially constant temperature in said zone;
    an override control switch connected to said motor operator, said override control switch effective when actuated to override said thermostat control switch and actuate said motor operator to stop further decrease in the volume of airflow to thereby establish a minimum volume of conditioned airflow delivered to said zone, said override switch including means for actuating said override switch whenever said volume of airflow drops to a predetermined minimum level; and
    an electrically controlled heat source in said zone, said override switch being connected with said heat source to activate the latter when said airflow sensing means actuates said override switch to interrupt operation of said motor operator.

4. An air distribution system as set forth in claim 3, wherein is included a second override control switch and a second electrically controlled heat source in said zone connected with said second switch, said second override switch operable to activate said second heat source upon being actuated by said airflow sensing means whenever said volume of airflow drops to a preselected level, said preselected level of airflow being greater than said predetermined minimum level.

* * * * *